United States Patent
Morioka et al.

(10) Patent No.: US 11,305,434 B2
(45) Date of Patent: Apr. 19, 2022

(54) ROBOT SYSTEM

(71) Applicant: FANUC CORPORATION, Yamanashi (JP)

(72) Inventors: Masahiro Morioka, Yamanashi (JP); Munehiro Jinushi, Yamanashi (JP); Akihiro Fukasawa, Yamanashi (JP); Ken Takahashi, Yamanashi (JP); Yasuhiro Nozawa, Yamanashi (JP); Hideyuki Watanabe, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 273 days.

(21) Appl. No.: 16/571,433

(22) Filed: Sep. 16, 2019

(65) Prior Publication Data

US 2020/0130199 A1 Apr. 30, 2020

(30) Foreign Application Priority Data

Oct. 26, 2018 (JP) .............................. JP2018-201860
Nov. 20, 2018 (JP) .............................. JP2018-217232

(51) Int. Cl.
*B25J 13/08* (2006.01)
*B25J 9/00* (2006.01)

(52) U.S. Cl.
CPC ........... *B25J 13/085* (2013.01); *B25J 9/0081* (2013.01)

(58) Field of Classification Search
CPC ...... B25J 13/085; B25J 9/0081; B25J 9/1666; G05B 19/423; G05B 2219/36433

(Continued)

(56) References Cited

U.S. PATENT DOCUMENTS

2008/0188985 A1 8/2008 Sakano
2010/0152896 A1* 6/2010 Komatsu ............... B25J 13/085
                                                              700/258

(Continued)

FOREIGN PATENT DOCUMENTS

EP    1 955 831 A2    8/2008
JP    S63-229293 A    9/1988

(Continued)

OTHER PUBLICATIONS

Japanese Office Action dated Dec. 22, 2020, in connection with corresponding JP Application No. 2018-217232 (13 pp., including machine-generated English translation).

*Primary Examiner* — Dalena Tran
(74) *Attorney, Agent, or Firm* — Maier & Maier, PLLC (57) ABSTRACT

A robot system includes a robot main body, a sensor that detects a magnitude of an external force applied to the robot main body, a control unit that controls the robot main body, a reference value storage unit that stores a value of an external force detected by the sensor as a reference external force value in an operating state where only the weight of the robot main body and the load handled by the robot main body act on the robot main body, a determination unit that, during operation of the robot main body, determines that an external force other than the weight of the robot main body and the load acts on the robot main body when an absolute value of a difference between a value of an external force detected by the sensor and the stored reference external force value is larger than a predetermined threshold value.

12 Claims, 9 Drawing Sheets

(58) Field of Classification Search
USPC ......... 700/245, 260; 901/1, 34, 46; 294/907; 318/567, 568.16, 568.12
See application file for complete search history.

(56) References Cited

U.S. PATENT DOCUMENTS

| | | |
|---|---|---|
| 2015/0258690 A1 | 9/2015 | Naitou |
| 2016/0167231 A1 | 6/2016 | Nakayama et al. |
| 2016/0243700 A1* | 8/2016 | Naitou .................. B25J 9/1633 |
| 2016/0279796 A1 | 9/2016 | Naitou et al. |
| 2016/0346935 A1 | 12/2016 | Nakayama et al. |
| 2017/0341239 A1 | 11/2017 | Nakayama |
| 2018/0093378 A1 | 4/2018 | Yamamoto et al. |
| 2018/0200881 A1 | 7/2018 | Ishii |
| 2018/0304464 A1 | 10/2018 | Naitou |
| 2020/0016742 A1* | 1/2020 | Ishikawa .................. B25J 9/163 |

FOREIGN PATENT DOCUMENTS

| | | | |
|---|---|---|---|
| JP | 2005279872 A | 10/2005 | |
| JP | 2008183680 A | 8/2008 | |
| JP | 2008188722 A | 8/2008 | |
| JP | 2009023047 A | 2/2009 | |
| JP | 2013-043232 A | 3/2013 | |
| JP | 2014018941 A | 2/2014 | |
| JP | 2015171747 A | 10/2015 | |
| JP | 2016112627 A | 6/2016 | |
| JP | 2016179510 A | 10/2016 | |
| JP | 2016221607 A | 12/2016 | |
| JP | 2017209758 A | 11/2017 | |
| JP | 2018-051734 A | 4/2018 | |
| JP | 2018111174 A | 7/2018 | |
| JP | 2018-176398 A | 11/2018 | |

\* cited by examiner

ROBOT SYSTEM

CROSS-REFERENCE TO RELATED APPLICATIONS

This application is based on Japanese Patent Applications Nos. 2018-201860 and 2018-217232, the contents of which are incorporated herein by reference.

FIELD

The present invention relates to a robot system.

BACKGROUND

There is a known cooperative robot that has a contact stop function of stopping when a person comes in contact therewith, stores a predetermined reference force, and stops the robot if a detected external force is greater than the stored reference force (for example, see Japanese Unexamined Patent Application, Publication No. 2018-51734).

SUMMARY

An aspect of the present invention is directed to a robot system that includes a robot main body, a sensor that detects the magnitude of an external force applied to the robot main body, a control unit that controls the robot main body, a reference value storage unit that, in an operating state in which only the weight of the robot main body and the load handled by the robot main body act on the robot main body, stores a value of the external force detected by the sensor as a reference external force value, and a determination unit that, during operation of the robot main body, determines that an external force other than the weight of the robot main body and the load acts on the robot main body when an absolute value of a difference between a value of the external force detected by the sensor and the reference external force value stored in the reference value storage unit is larger than a predetermined threshold value.

DETAILED DESCRIPTION

A robot system 1 according to an embodiment of the present invention will be described below with reference to the drawings.

The robot system 1 according to the present embodiment is a system including a cooperative robot (hereinafter, robot main body) 2 that can operate while sharing a work area with a human without a safety fence.

Figure 1:
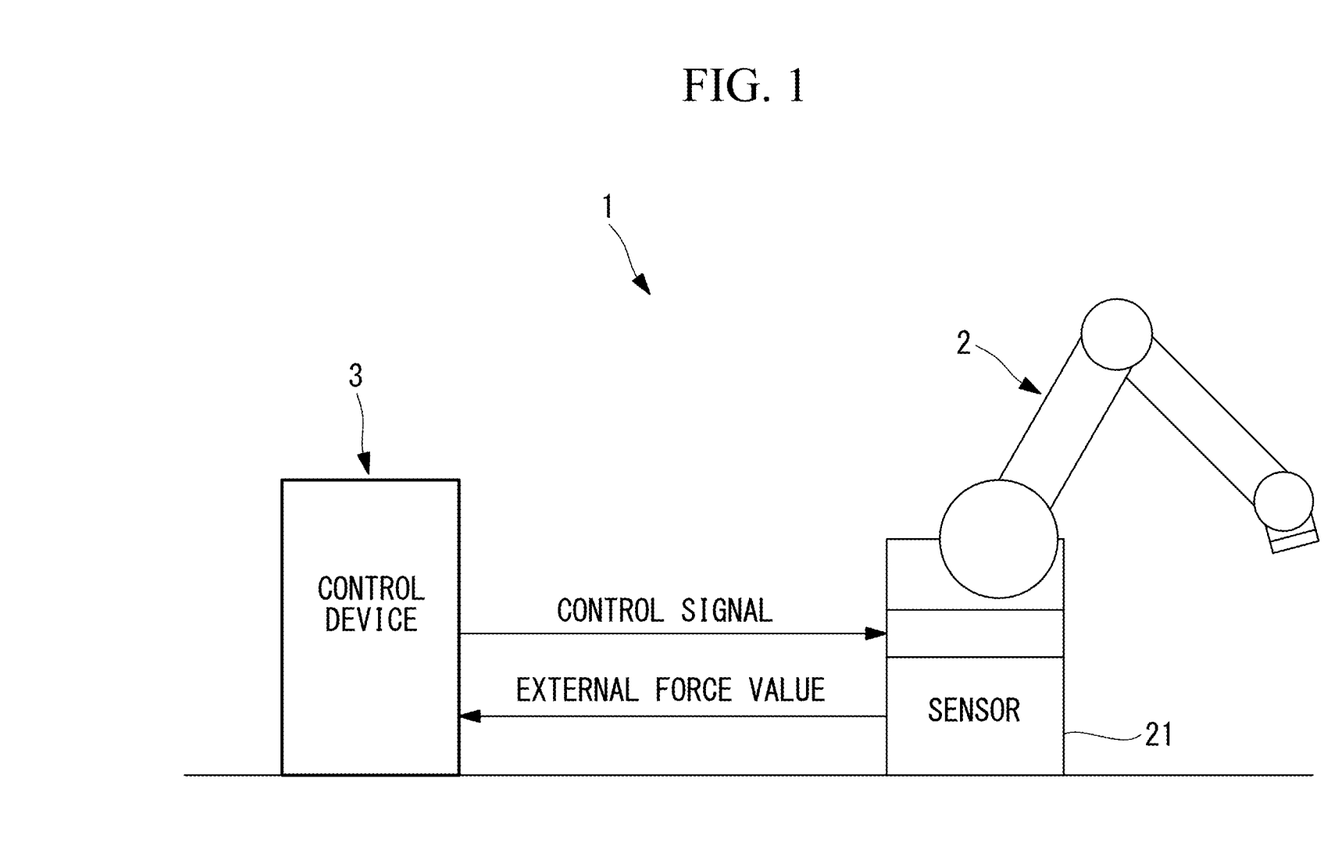
FIG. 1 is an overall configuration diagram illustrating a robot system according to an embodiment of the present invention.

As illustrated in FIG. 1, the robot system 1 includes the robot main body 2 and a control device 3 that controls the robot main body 2.

The robot main body 2 is a vertical articulated robot in the example illustrated in FIG. 1, but any other form may be adopted.

The robot main body 2 is provided with a sensor 21 that detects the magnitude of an external force. As the sensor 21, at least one of a force sensor, a torque sensor, or a skin sensor incorporated in the robot main body 2 or attached to the robot main body 2 may be employed. In the present embodiment, the sensor 21 is disposed below a first axis of the robot main body 2 in order to simplify the description.

The sensor 21 can detect, in addition to the weight of the robot main body 2 itself and the load handled by the robot main body 2, an external force such as a load applied to the robot main body 2 when, for example, an operator or the like comes into contact with the robot main body 2 or the robot main body 2 comes into contact with another peripheral object.

The control device 3 includes a processor and a memory.

The control device 3 includes a control unit (processor) 31 that controls the operation of the robot main body 2 when executing a teaching program taught in advance, and the operator operates a teaching operation panel (not illustrated) to enter an operation input, thereby controlling the robot main body 2 to execute a jog feed operation.

Figure 2:
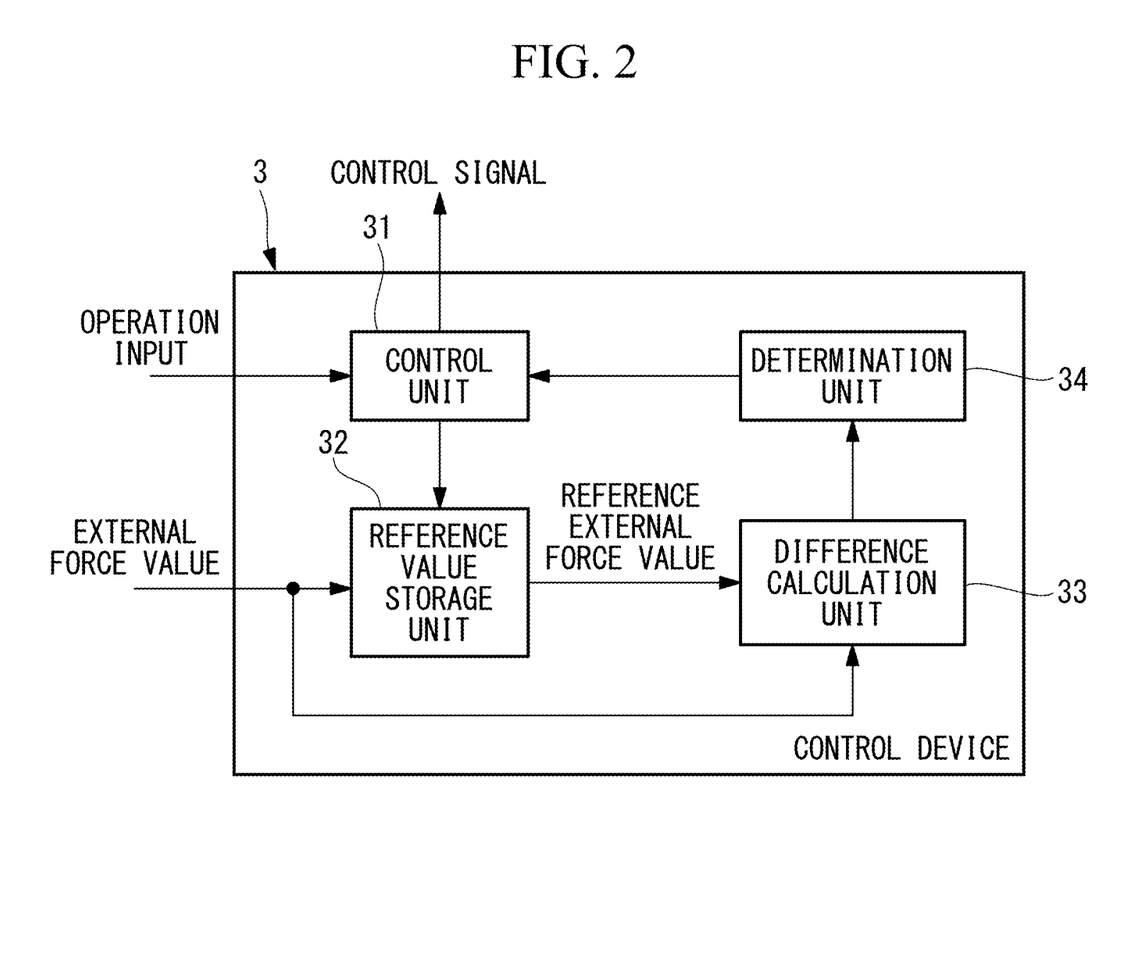
FIG. 2 is a block diagram illustrating a control device provided in the robot system in FIG. 1.

In addition, as illustrated in FIG. 2, the control device 3 includes a reference value storage unit 32 (memory) that, in a specific operating state in which only the weight of the robot main body 2 and the load handled by the robot main body 2 act on the robot main body 2, stores the value of an external force detected by the sensor 21 as a reference external force value, a difference calculation unit (processor) 33 that calculates the absolute value of the difference between the value of an external force detected by the sensor 21 during operation of the robot main body 2 and the reference external force value, and a determination unit (processor) 34 that determines whether the absolute value of the difference calculated by the difference calculation unit 33 is larger than a predetermined threshold value.

The control unit 31 has a contact stop function for stopping the operation of the robot main body 2 and a function for reducing the robot speed when the determination unit 34 determines that the absolute value of the difference is larger than a predetermined threshold.

The specific operating state is a stopped state or a low-speed operating state of the robot main body 2, and the timing at which the reference external force value is stored in the reference value storage unit 32 differs depending on the operation mode of the robot main body 2.

For example, in the operation mode in which the robot main body 2 is manually operated by operation of the teaching operation panel, an external force value detected by the sensor 21 may be stored as a reference external force value each time the robot main body 2 is stopped or in a low-speed operating state during the jog feed operation of the robot main body 2. Alternatively, the external force value may be stored at any timing according to the instruction of the operator.

In addition, for example, in an operation mode in which the robot main body 2 automatically operates in accordance with a teaching program, a command to bring the robot main body 2 to a stopped state or a low-speed operating state at a plurality of appropriate teaching points of the teaching program is taught, and specific operating states are realized at a plurality of points on the operation path, and, at those times, an external force value detected by the sensor 21 may be stored as a reference external force value.

The operation of the robot system 1 according to the present embodiment configured as described above will be described below.

As a case where the magnitude of the load handled by the robot main body 2 using the robot system 1 according to the present embodiment changes markedly, for example, as illustrated in FIGS. 3 to 9, the operation of installing a wire body 4, which is long and flexible, on another device 5 such as another robot can be mentioned.

In this operation, the robot main body 2 is provided with a hand 22 at the front end thereof, and the robot main body 2 is operated in accordance with the teaching program.

Figure 3:
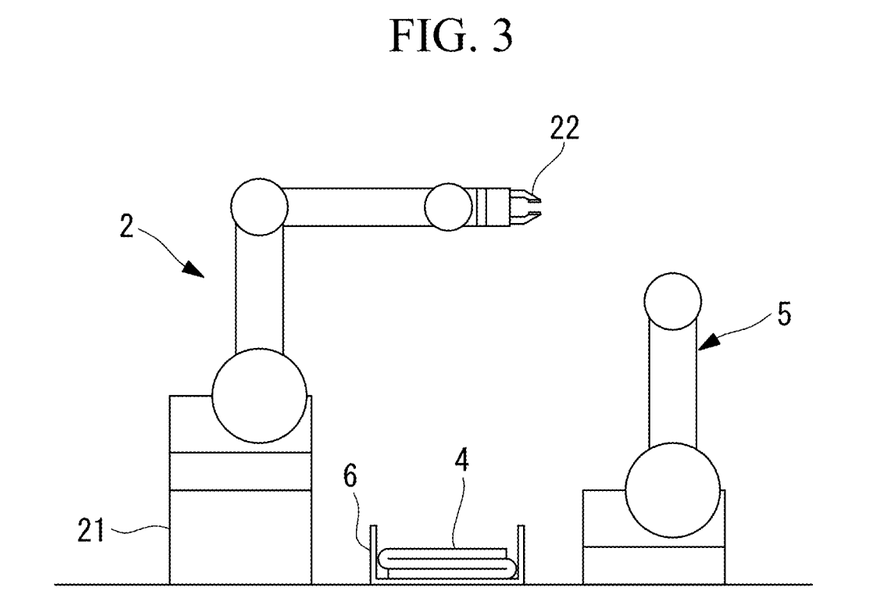
FIG. 3 is a view illustrating an initial position of an operation of installing a wire body on a robot by using the robot system in FIG. 1.
Figure 4:
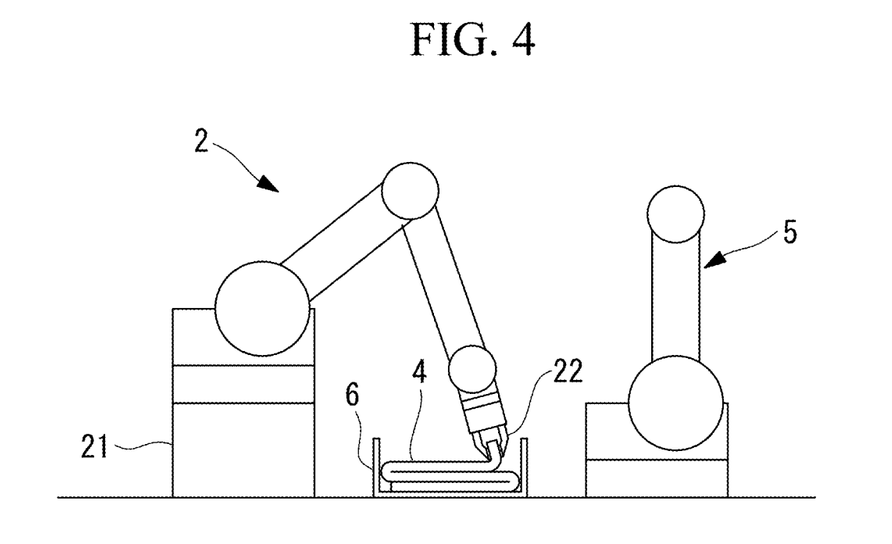
FIG. 4 is a view illustrating a first position where a hand is lowered from the state in FIG. 3 to grip a wire body.
Figure 6:
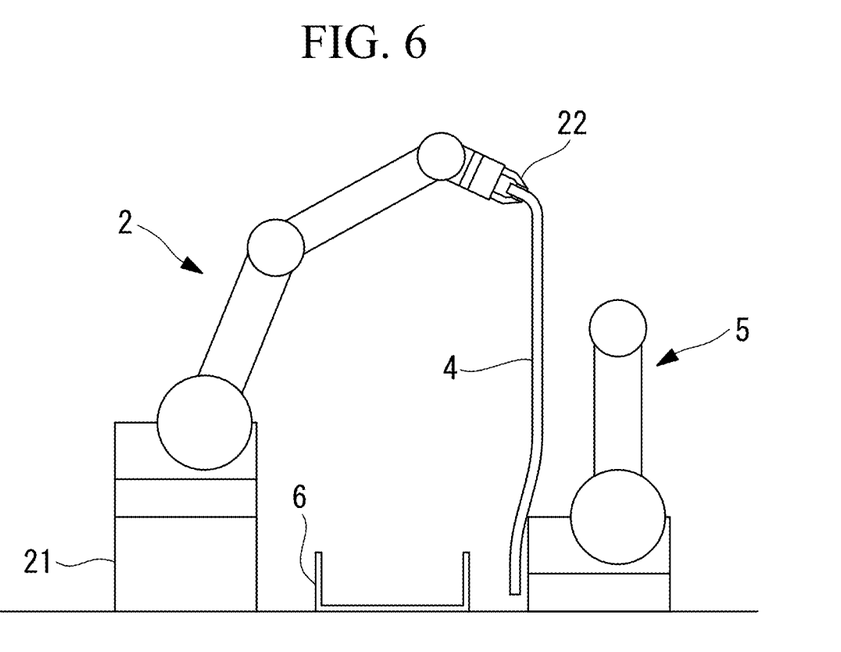
FIG. 6 is a view illustrating a second position in which the wire body is sufficiently lifted from the state in FIG. 5.

In the operation of the robot main body 2, first, as illustrated in FIG. 3, the hand 22 is lowered from a state in which the hand 22 is disposed in an initial position to, as illustrated in FIG. 4, a first position in a pallet 6, and the tip of the wire body 4 contained in the pallet 6 is gripped by the hand 22. Next, in a state in which the tip of the wire body 4 is gripped, as illustrated in FIG. 6, the hand 22 is raised to a sufficiently high second position, and at that position, the hand 22 enters a standby state waiting for the operator's operation input.

Figure 8:
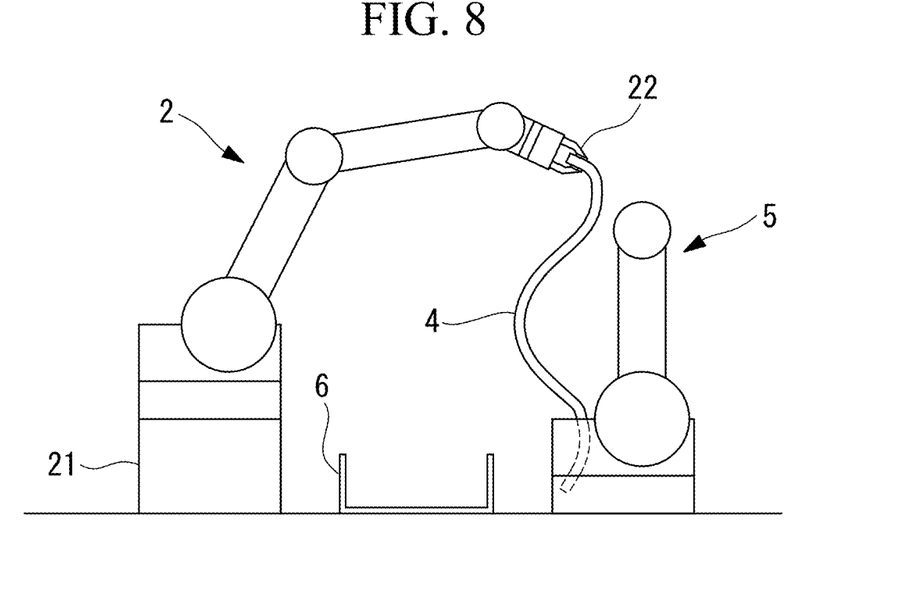
FIG. 8 is a view illustrating a third position in which the hand is slightly lowered from the second position in FIG. 7.

When the operator performs an operation input, as illustrated in FIG. 8, the hand 22 is moved to a third position lower than the second position, and, at this position, the process waits for the operator's operation input again. When lowered to the third position, the tip of the wire body 4 held by the hand 22 is released, and the operation is completed by returning to the initial position.

Figure 10:
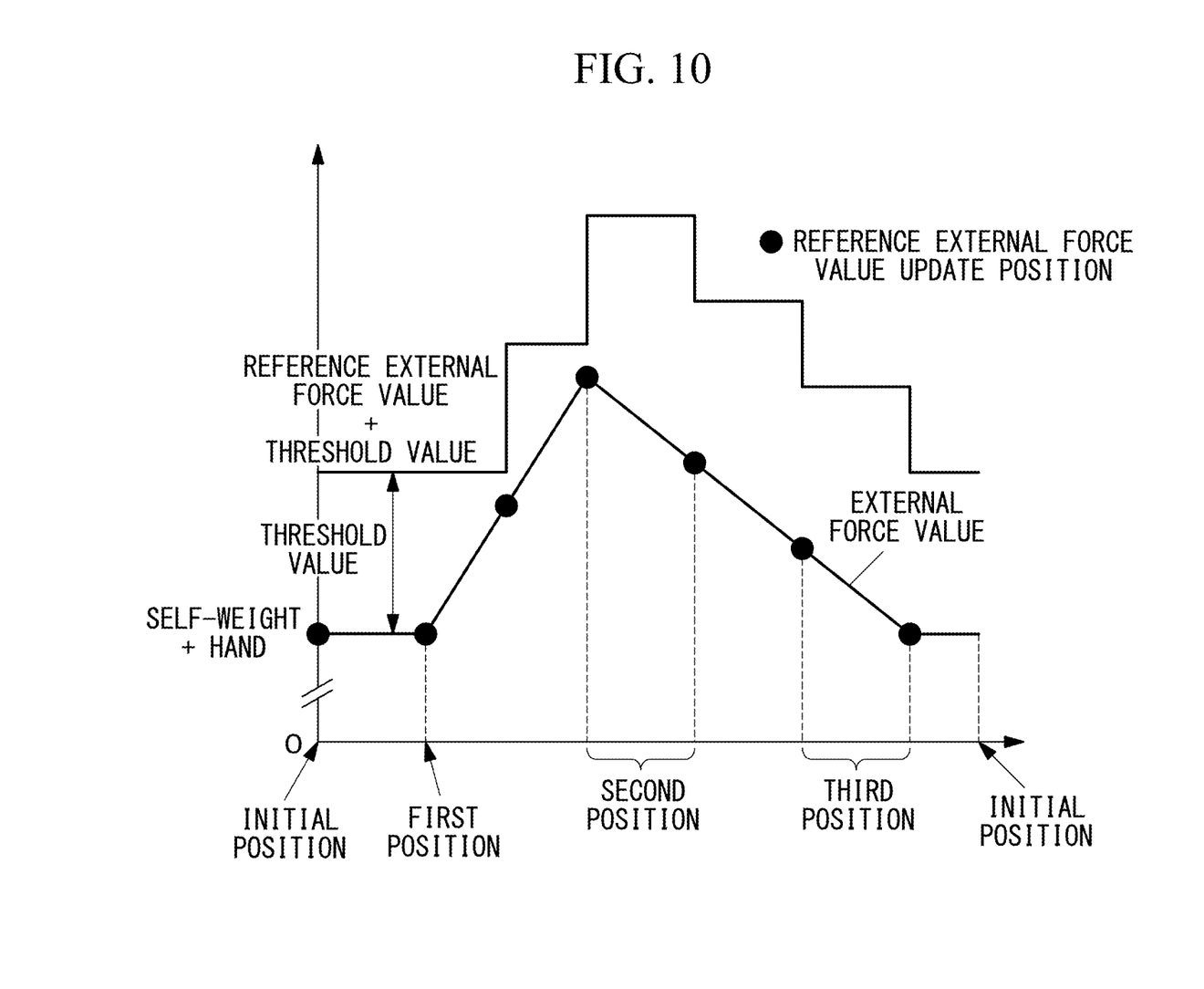
FIG. 10 is a graph illustrating changes in an external force value detected by a sensor, an updated position for a reference external force value, and a reference external force value+a threshold in the operation illustrated in FIGS. 3 to 9.

In this operation, from the initial position in FIG. 3 to the first position in FIG. 4, as illustrated in FIG. 10, only the weight of the robot main body 2 and the weight of the hand 22 act on the sensor 21, and at the initial position, the value of an external force detected by the sensor 21 is stored in the reference value storage unit 32 as the first reference external force value.

Then, because the wire body 4 in the pallet 6 is gradually lifted while the robot main body 2 operates from the first position where the wire body 4 is gripped by the hand 22 in the first position to the second position, the value of the external force detected by the sensor 21 gradually increases. An external force value is detected by the sensor 21 at predetermined time intervals, the difference between the detected external force value and the reference external force value stored in the reference value storage unit 32 is calculated by the difference calculation unit 33, and the determination unit 34 determines whether the calculated absolute value of the difference exceeds a predetermined threshold value. When the absolute value of the difference exceeds the threshold value, the operation of the robot main body 2 is stopped by the contact stop function of the control unit 31.

Figure 5:
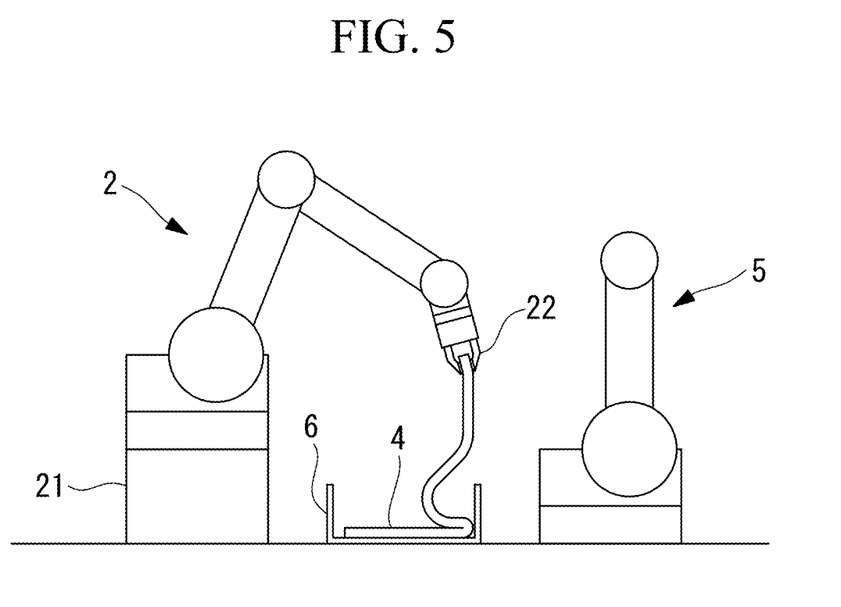
FIG. 5 is a view illustrating a position midway during lifting of the wire body by raising the hand from the state in FIG. 4.

In the present embodiment, a teaching point is provided at each of the initial position and the first to third positions where the robot main body 2 is stopped and, as illustrated in FIG. 5, a teaching point is provided for each position where the absolute value of the difference between the first position and the second position does not exceed the threshold value. The number of teaching points is arbitrary. Then, at each teaching point, a command for realizing a specific operating state is taught, and, at that time, a command for updating the value in the reference value storage unit 32 with the value of an external force detected by the sensor 21 as a new reference external force value is taught.

Figure 7:
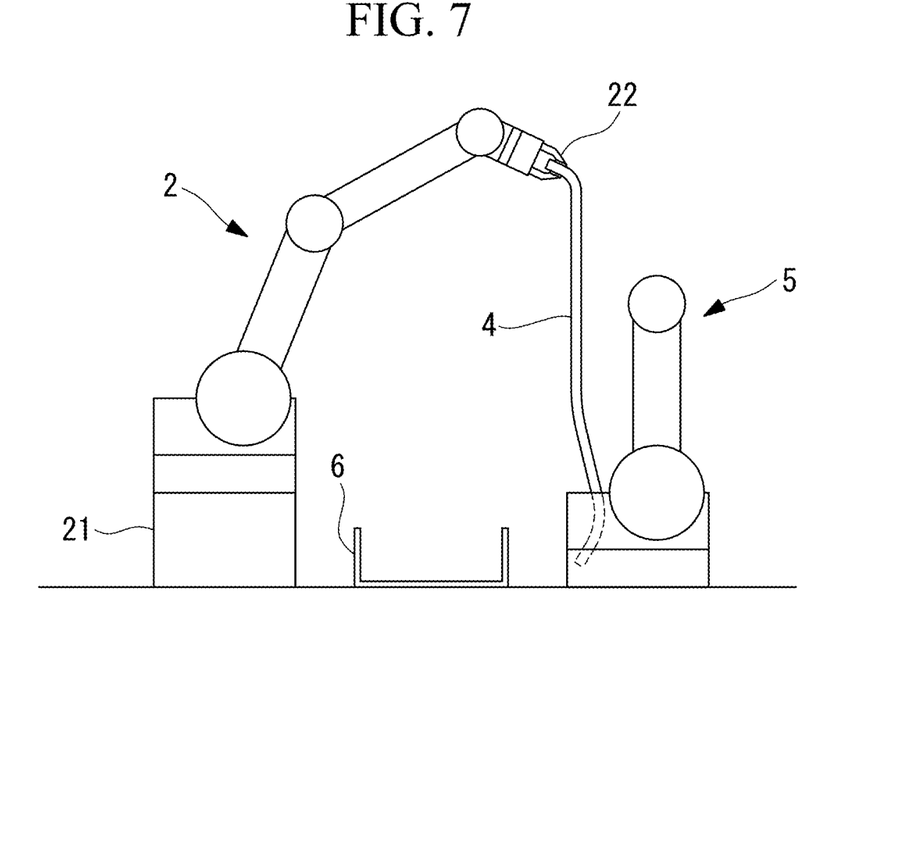
FIG. 7 is a view illustrating a state in which the installation of the wire body to the robot is started at the second position in FIG. 6.

Next, as illustrated in FIG. 7, because, in the second position, installation is started from the lower end of the wire body 4, which is suspended, to the other device 5, the weight of the wire body 4 supported by the hand 22 is gradually reduced, and the external force value detected by the sensor 21 becomes smaller. In this case, it is assumed that the weight change of the wire body 4 due to the installing operation at the second position does not exceed the threshold value.

Then, when the installation of the wire body 4 at the second position is finished, by the operator performing an operation input on the teaching operation panel, as illustrated in FIG. 10, the robot main body 2 moves from the second position to the third position illustrated in FIG. 8 after the reference external force value has been updated again. Thereby, slack is formed in the wire body 4 for performing installation at the third position.

Figure 9:
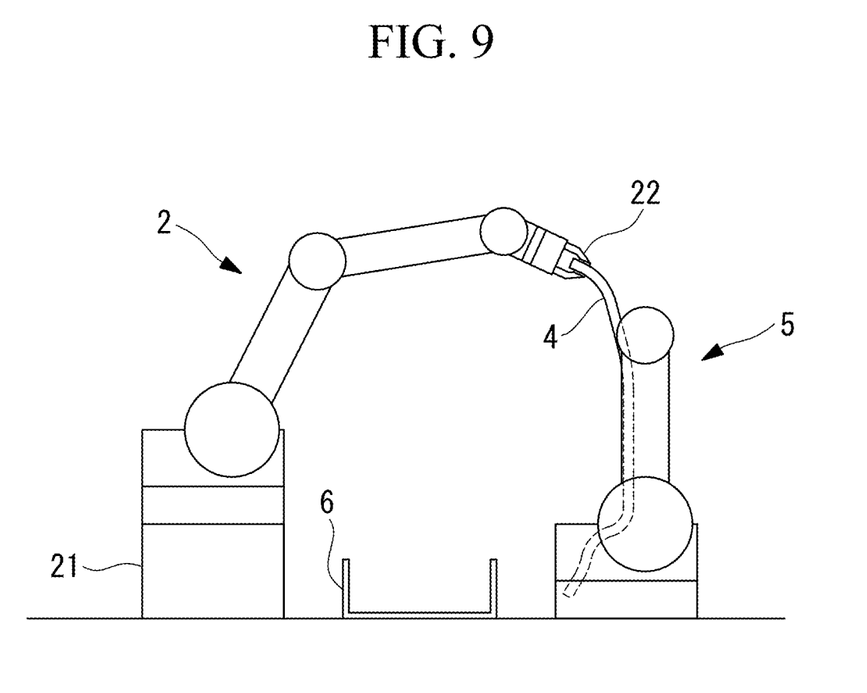
FIG. 9 is a view illustrating a state in which the wire body is installed on the robot at the third position in FIG. 8.

When the robot main body 2 moves to the third position and stops and enters a standby state, the value in the reference value storage unit 32 is updated with an external force value detected by the sensor 21 as a new reference external force value. As illustrated in FIG. 9, it is assumed that the weight change of the wire body 4 caused by the installation at the third position does not exceed the threshold value. As illustrated in FIG. 10, after the wire body 4 has been released at the third position, the reference external force value is updated again, and the robot main body 2 returns to the initial position using the updated reference external force value.

Thus, according to the robot system according to the present embodiment, in an operation in which the magnitude of the load handled by the robot main body 2 changes continuously, even if the magnitude of the load changes beyond the threshold value for activating the contact stop function, there is an advantage that the operation can be continued without erroneous stopping by the contact stop function without having to set a load change pattern in advance.

That is, since an external force value detected by the sensor 21 is updated to serve as the reference external force value for the contact stop function in a state in which a specific operating state is realized during operation of the robot main body 2, there is no need to set a load change pattern in advance. In addition, even when a load change pattern is not determined, there is an advantage that the work can be continued while maintaining the contact stop function.

Further, in the present embodiment, in the operation of executing a teaching program, a specific operating state is realized at a teaching point appropriately set in the teaching program, and an external force value detected by the sensor 21 is automatically updated to serve as a reference external force value; however, instead of this, in an operation in which an operator manually operates the robot main body 2 by operating the teaching operation panel, the reference external force value may be updated by using an external force value detected by the sensor 21 each time the robot main body 2 is in a stopped state or a low-speed operating state.

In addition, in the present embodiment, as illustrated in FIG. 10, even though a specific operating state was realized and the external force value was updated at seven teaching points; instead of this, the frequency at which updating is performed may be further increased. Consequently, the threshold value can be made smaller and the sensitivity of the contact stop function can be increased.

In addition, when a person is not in contact with the robot main body 2 and in a specific operating state in which only the weight of the robot main body 2 and the load handled by the robot main body 2 act on the robot main body 2, by storing a reference external force value, a more accurate reference external force value can be recorded. Consequently, the threshold can be reduced, and the sensitivity of the contact stop function can be increased. In order to detect that a person is not in contact with the robot main body 2, it is preferable to use a laser-type area sensor or a vision sensor that is installed around the robot main body 2 and that can detect the approach of a person.

Figure 11:
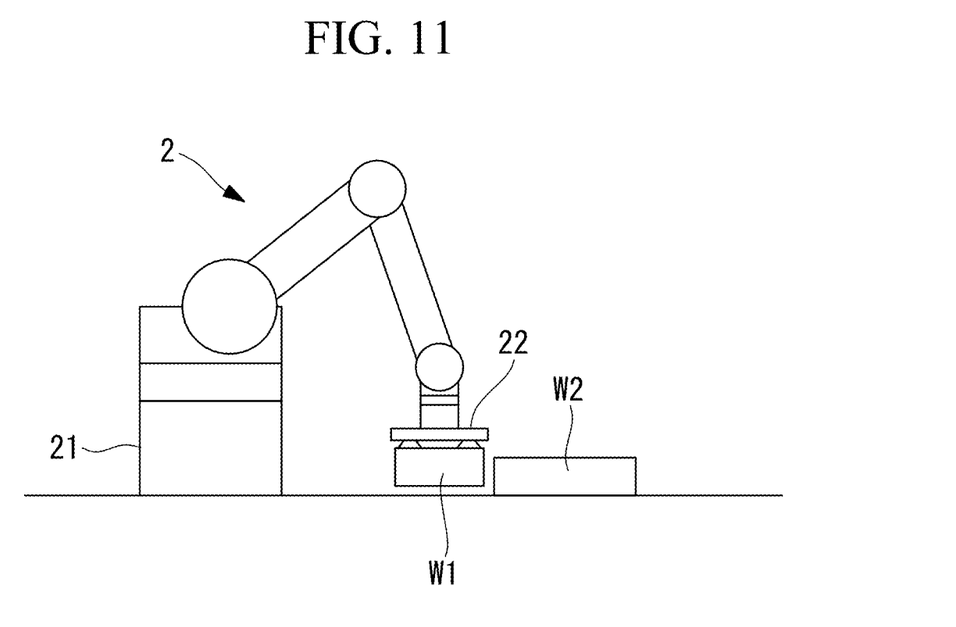
FIG. 11 is a view illustrating a state in which a lightweight workpiece is slightly lifted to update a reference external force value in multi-kind palletizing, which is another application of the robot system in FIG. 1.
Figure 12:
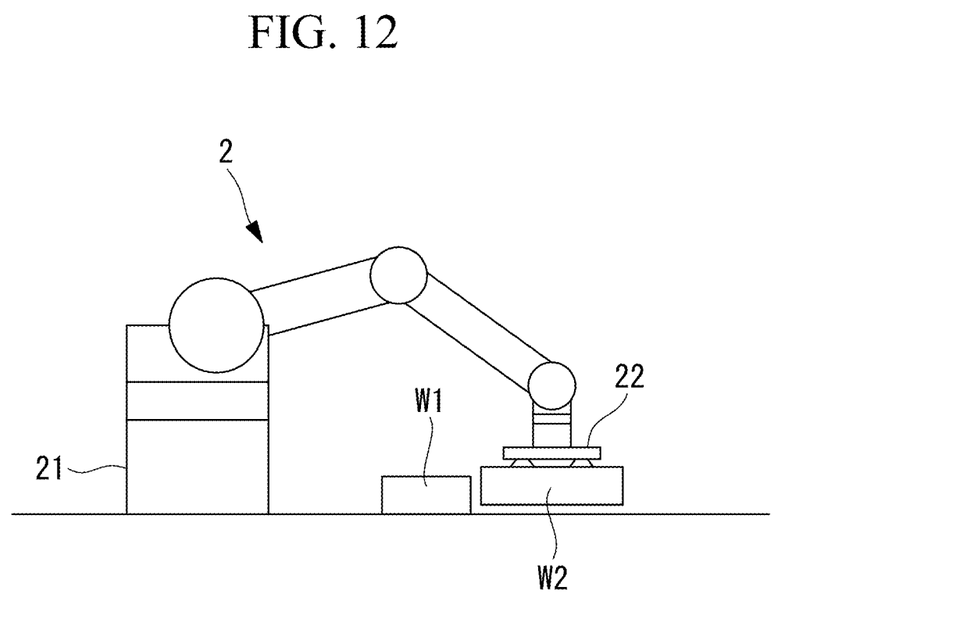
FIG. 12 is a diagram illustrating a state of switching to a heavy workpiece in FIG. 11 and updating the reference external force value.

In addition, in the present embodiment, an operation in which the load changes continuously, as in the case of raising and lowering the wire body 4, which is flexible, is described as an example; however, the present invention is not limited to this, and as illustrated in FIGS. 11 and 12, it may be applied to a case where the weights of workpieces W1 and W2 to be held are different.

For example, when holding the two workpieces W1 and W2 having different weights, as in the case of multi-kind palletizing work, as illustrated in FIGS. 11 and 12, in a state where each of the workpieces W1 and W2 is held by the hand 22 and slightly lifted, a specific operating state may be realized, and the reference external force value may be updated with the external force value detected by the sensor 21 at that point.

In addition, the present invention can be similarly applied to a case where three or more workpieces having different weights are replaced. In this case, the weight difference between the workpieces may be smaller than the threshold value, or when defining the order in which the workpieces are to be held, the weight difference between the workpieces having adjacent weights may be smaller than the threshold value. In this case, by making the threshold value smaller, it is possible to increase the sensitivity of the contact stop.

In addition, in the present embodiment, the following method of installing the wire body 4 is also disclosed.

To date, the installation of a wire body has been sequentially performed from the lower side of the other device while the operator lifted a long, heavy wire body. However, if many wire bodies are bundled together, if a high-current wire body is included, or if a wire body assembled with a metal plate for fixing the wire body and a distribution panel etc. is handled, there is a disadvantage that the weight of the wire becomes large and the burden on the operator is large.

In contrast, in a method of installing the wire body 4, in a state where one end of the wire body 4 is held and lifted by the hand 22 attached to the front end of the robot main body 2, a step in which the operator carries out a part of the operation of installing the wire body 4 to the other device 5 from the other end of the wire body 4 and the step of lowering the hand 22 by the operation of the robot main body 2 to a position where the wire body 4 is loosened by an amount necessary for the next installing operation are repeated.

Figure 13:
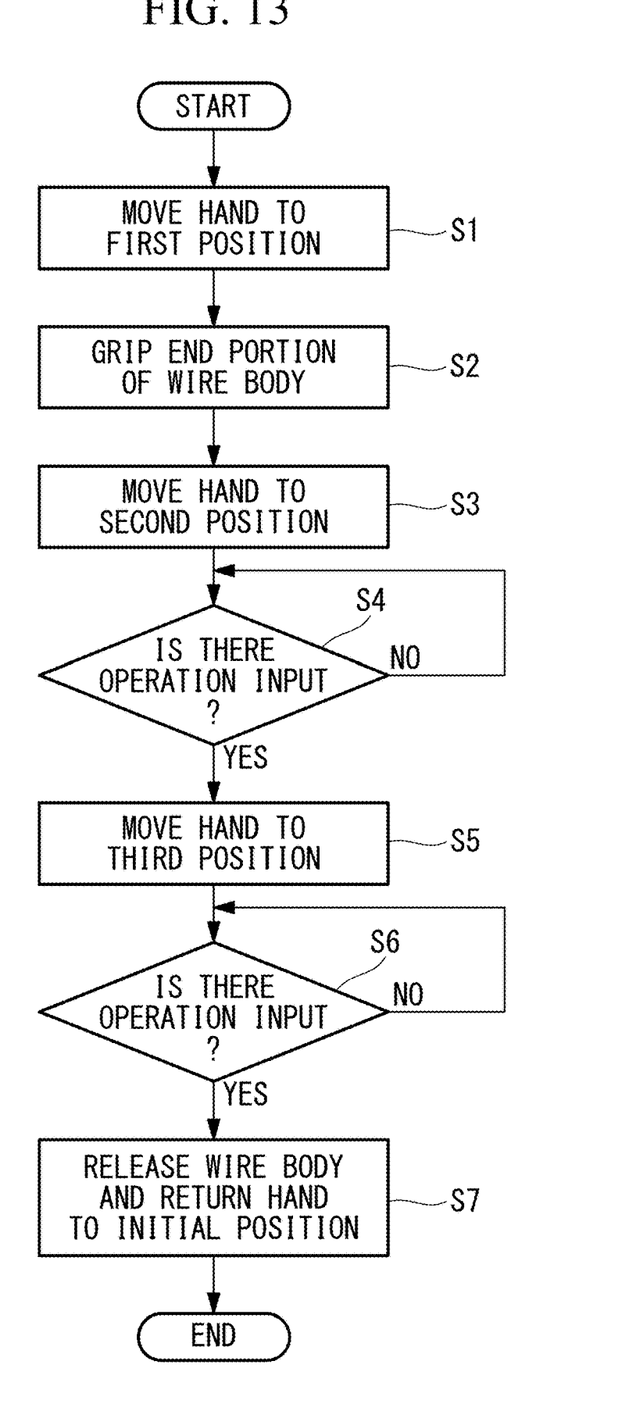
FIG. 13 is a flowchart for explaining a method of installing a wire body.

Specifically, as illustrated in FIG. 13, from the state of being disposed in the initial position, as illustrated in FIG. 4, the hand 22 is lowered to a first position in the pallet 6 (step S1), and the end of the wire body 4 stored in the pallet 6 is gripped by the hand 22 (step S2). Next, in a state in which the tip of the wire body 4 is gripped, as illustrated in FIG. 6, the hand 22 is raised to a sufficiently high second position (step S3), and a standby state in which an operator's operation input is awaited at that position is set (step S4).

Then, when the operator performs an input operation, as illustrated in FIG. 8, the hand 22 is moved to a third position lower than the second position (step S5), and at this position, a standby state in which the operator's operation input is awaited again is set (step S6). After lowering to the third position, the tip of the wire body 4 held by the hand 22 is released, and the hand 22 is returned to the initial position (step S7), whereby the operation is completed.

According to the method of installing the wire body 4, the wire body 4, in a state of being lifted by the robot main body 2, can be installed on the other device 5 from below, and, at that time, since the weight of the wire body 4 is supported by the robot main body 2, there is an advantage that the burden on the operator can be reduced since the operator does not have to lift the wire body 4.

Then, each time the installation of the lower portion of the wire body 4 is completed, the robot main body 2 operates so as to form slack to install the next lower portion of the wire body 4. As a result, the operator can gradually install the wire body 4 without lifting the wire body 4.

In this case, from the initial position in FIG. 3 to the first position in FIG. 4, as illustrated in FIG. 10, only the weight of the robot main body 2 and the weight of the hand 22 act on the sensor 21, and at the initial position, the value of an external force detected by the sensor 21 is stored in the reference value storage unit 32 as the first reference external force value.

Then, because the wire body 4 in the pallet 6 is gradually lifted while the robot main body 2 operates from the first position where the wire body 4 is gripped by the hand 22 in the first position to the second position, the value of the external force detected by the sensor 21 gradually increases. The external force value is detected by the sensor 21 at predetermined time intervals, the difference between the detected external force value and the reference external force value stored in the reference value storage unit 32 is calculated by the difference calculation unit 33, and the determination unit 34 determines whether the calculated absolute value of the difference exceeds a predetermined threshold. When the absolute value of the difference exceeds the threshold value, the operation of the robot main body 2 is stopped by the contact stop function of the control unit 31.

In the present embodiment, a teaching point is provided at each of the initial position and the first to third positions where the robot main body 2 is stopped and, as illustrated in FIG. 5, a teaching point is provided for each position where the absolute value of the difference between the first position and the second position does not exceed the threshold. The number of teaching points is arbitrary. Then, at each teaching point, a command for realizing a specific operating state is taught, and, at that time, a command for updating the value in the reference value storage unit 32 with the value of an external force detected by the sensor 21 to serve as a new reference external force value is taught.

Next, as illustrated in FIG. 7, because, in the second position, installation is started from the lower end of the wire body 4, which is suspended, to the other device 5, the weight of the wire body 4 supported by the hand 22 is gradually reduced, and the external force value detected by the sensor 21 becomes smaller. In this case, it is assumed that the weight change of the wire body 4 due to the installing operation at the second position does not exceed the threshold.

Then, when the installation of the wire body 4 at the second position is finished, as illustrated in FIG. 10, the operator performs an operation input on the teaching operation panel, thereby moving the robot main body 2 from the second position to the third position illustrated in FIG. 8 after the reference external force value has been updated again. Thereby, slack is formed in the wire body 4 for performing installation at the third position. In addition, the teaching operation panel is not limited to the teaching operation panel provided on the robot main body 2 itself, and a wired or wireless remote controller may be installed separately.

When the robot main body 2 moves to the third position and stops and enters a standby state, the value in the reference value storage unit 32 is updated with the external force value detected by the sensor 21 to serve as a new reference external force value. As illustrated in FIG. 9, it is assumed that the weight change of the wire body 4 caused by the installation at the third position does not exceed the threshold value. As illustrated in FIG. 10, after the wire body 4 has been released at the third position, the reference external force value is updated again, and the robot main body 2 returns to the initial position using the updated reference external force value.

As a result, the above-identified embodiment leads to the following aspect.

An aspect of the present invention is directed to a robot system that includes a robot main body, a sensor that detects the magnitude of an external force applied to the robot main body, a control unit that controls the robot main body, a reference value storage unit that, in an operating state in which only the weight of the robot main body and the load handled by the robot main body act on the robot main body, stores a value of the external force detected by the sensor as a reference external force value, and a determination unit that, during operation of the robot main body, determines that an external force other than the weight of the robot main body and the load acts on the robot main body when an absolute value of a difference between a value of the external force detected by the sensor and the reference external force value stored in the reference value storage unit is larger than a predetermined threshold value.

According to this aspect, in an operating state in which only the weight of the robot main body and the load handled by the robot main body are acting on the robot main body, the magnitude of an external force applied to the robot main body is detected by the sensor and the value of the detected external force is stored in the reference value storage unit as a reference external force value. Then, during operation of the robot main body, the determination unit determines that an external force other than the weight of the robot main body and the load to be handled is acting on the robot main body in the case where the absolute value of the difference between the value of an external force detected by the sensor and the reference external force value stored in the reference value storage unit is calculated and the absolute value of the difference is larger than the threshold value.

That is, in an operating state in which only the weight of the robot main body and the load handled by the robot main body act on the robot main body at each position of the operation of the robot main body, the magnitude of the external force detected each time by the sensor can be used as the reference external force value. Therefore, even when the load handled by the robot main body changes markedly, it is not necessary to acquire a reference external force value in advance, and the operation can be continued without erroneous stopping by the contact stop function.

In the above aspect, the reference value storage unit may update the reference external force value at a plurality of locations on an operating path of the robot main body.

With this configuration, at a plurality of locations on the operating path of the robot main body, the magnitude of the external force applied to the robot main body is detected by the sensor in an operating state in which only the weight of the robot main body and the load handled by the robot main body are acting on the robot main body, and the value of the detected external force is stored in the reference value storage unit as a reference external force value. Consequently, even if the pattern of change of the external force at each position along the operating path of the robot main body is not constant, when the load handled by the robot main body changes significantly, it can be operated without erroneous stopping by the contact stop function by using the reference external force value actually detected in multiple locations.

In addition, in the above aspect, the reference value storage unit may store the reference external force value when the robot main body is in a stopped state or in a low-speed operating state.

With this configuration, it is possible to easily achieve an operating state in which only the weight of the robot main body and the load handled by the robot main body are acting on the robot main body with the robot main body in a stopped state or a low-speed operating state.

In addition, in the above aspect, the sensor may be any of at least one force sensor, a torque sensor, or a skin sensor incorporated in or attached to the robot main body.

With this configuration, it is possible to accurately detect an external force acting on the robot main body in an operating state in which only the weight of the robot main body and the load handled by the robot main body are acting on the robot main body.

In addition, in the above aspect, the reference value storage unit may store the reference external force value each time the robot main body being manually operated by the operator is in a stopped state or in a low-speed operating state.

With this configuration, when the operator manually operates the robot main body, such as during a teaching operation or during hand guiding in which the robot main body is directly operated, if the magnitude of the load changes significantly, by storing the reference external force value detected by the sensor in the reference value storage unit each time the robot main body is in a stopped state or a low-speed operating state, it is not necessary to obtain the reference external force value in advance, and the operation can be continued without erroneous stopping by the contact stop function.

In addition, in the above aspect, the reference value storage unit, during execution of a teaching program, may store the reference external force value at any teaching point set in the teaching program, or at predetermined time intervals or at predetermined movement distances, with the robot main body in a stopped state or a low-speed operating state.

With this configuration, the robot main body is brought to a stopped state or a low-speed operating state at appropriate times during execution of the teaching program to detect and store a reference external force value. As a result, when the load handled by the robot main body changes markedly, the robot can be operated without erroneous stopping by the contact stop function even if a reference external force value is not obtained in advance in the teaching operation.

In addition, in the above aspect, the reference value storage unit may automatically update the reference external force value when the robot main body is in a stopped state or a low-speed operating state.

In addition, in the above aspect, the reference value storage unit stores the reference external force value when a person is not in contact with the robot main body, and in an operating state in which only the weight of the robot main body and the load handled by the robot main body are acting on the robot main body.

According to the present invention, even when a load handled by the robot main body changes significantly, it is possible to continue operation without erroneous stopping by the contact stop function without having to set a load change pattern in advance.

The invention claimed is:

1. A robot system comprising:
   a robot main body;
   a sensor that detects a magnitude of an external force applied to the robot main body, the external force including a weight of the robot main body, a load handled by the robot main body, and a force received from a person or an object coming into contact with the robot main body; and
   a processor;
   wherein the processor is configured to:
   control the robot main body;
   store, in a memory, a value of the external force detected by the sensor as a reference external force value, in a specific operating state in which only the weight of the robot main body and the load handled by the robot main body act on the robot main body; and
   determine that, during operation of the robot main body, an external force other than the weight of the robot main body and the load acting on the robot main body when an absolute value of a difference between the external force detected by the sensor and the reference external force value stored in the memory is larger than a predetermined threshold value, and
   wherein a magnitude of the load handled by the robot main body changes continuously.

2. The robot system according to claim 1, wherein the processor is further configured to update the reference external force value stored in the memory at a plurality of locations on an operation path of the robot main body.

3. The robot system according to claim 1, wherein the processor is further configured to store, in the memory, the reference external force value when the robot main body is in a stopped state or in a low-speed operating state.

4. The robot system according to claim 1, wherein the sensor is at least one of a force sensor, a torque sensor, and a skin sensor incorporated in or attached to the robot main body.

5. The robot system according to claim 1, wherein the processor is further configured to store, in the memory, the reference external force value each time the robot main body manually operated by an operator is in a stopped state or a low-speed operating state.

6. The robot system according to claim 1, wherein the processor is further configured to store, in the memory, during execution of a teaching program, the reference external force value at any teaching point set in the teaching program, or at predetermined time intervals or at predetermined movement distances, with the robot main body in a stopped state or a low-speed operating state.

7. The robot system according to claim 1, wherein the processor is further configured to automatically update the reference external force value stored in the memory when the robot main body is in a stopped state or in a low-speed operating state.

8. The robot system according to claim 1, wherein the processor is further configured to store, in the memory, the reference external force value when a person is not in contact with the robot main body, and in an operating state in which only the weight of the robot main body and the load handled by the robot main body are acting on the robot main body.

9. The robot system according to claim 1, wherein the load is a wire body.

10. The robot system according to claim 9, wherein the robot main body is configured to carry out an operation path in which the robot main body first lifts the wire body above a workpiece, enabling an operator to install the wire body to the workpiece, and then successively lowers the wire body, creating slack in the wire body, to enable the operator to carry out successive installation steps securing the wire body to the workpiece.

11. The robot system according to claim 10, wherein the processor is configured to update the reference external force value stored in the memory at a plurality predetermined time intervals along the operation path.

12. The robot system according to claim 1,
   wherein the processor is configured to update the reference external force value, during the operation of the robot main body, by storing, in the memory, the value of the external force detected by the sensor as a new reference external force value when the specific operating state is reached, and
   wherein the reference external force value stored in the memory changes according to a change in the magnitude of the load.

* * * * *